United States Patent Office
2,951,685
Patented Sept. 6, 1960

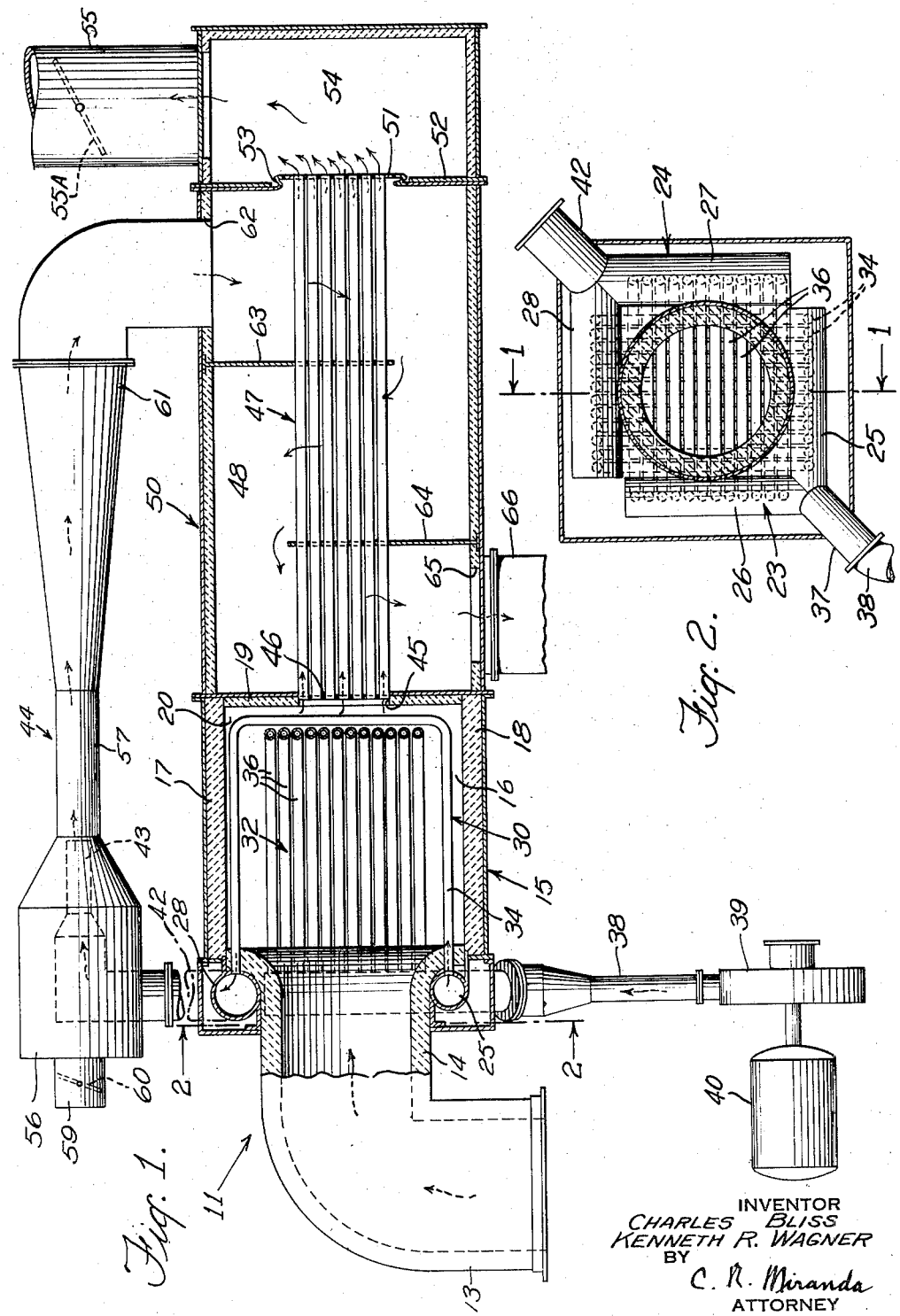

2,951,685

HEAT EXCHANGE APPARATUS

Charles Bliss, Dobbs Ferry, N.Y., and Kenneth R. Wagner, Jersey City, N.J., assignors to Foster Wheeler Corporation, New York, N.Y., a corporation of New York Filed Nov. 12, 1954, Ser. No. 468,329

5 Claims. (Cl. 257—235)

This invention relates to heat exchange apparatus and more particularly to apparatus for heating one fluid by passing it in heat exchange relationship with another fluid.

Heat exchange apparatus are employed in conjunction with furnaces to recover heat from combustion gases, either as steam generating equipment in the form of waste heat generators, or as air preheating equipment for preheating combustion air used for burning fuel required by the furnace. In industrial furnaces, as for example, metallurgical industries, cement manufacture where high temperature gases are produced in calcining limestone, general heating furnaces in steel mills and petroleum refining furnaces, standard air preheater convection sections are uneconomical; and waste heat generators also are undesirable because of an otherwise steam surplus in the plant and no saving in actual fuel consumption. In industrial furnaces, high temperature gases are exhausted and, therefore, if air preheating equipment could be used it would offer an advantage not offered by other methods of heat recovery in the fact that fuel burned with preheated air results in higher flame temperatures than for combustion with normal temperature air. The higher flame temperatures, in turn, result in higher rates of heat transfer by radiation and a consequent increase in equipment capacity.

Air preheating equipment has generally been impractical in the past, when used with industrial furnaces, because of a lack of suitable structure using common materials of construction that will withstand the high combustion gas temperatures entering the air preheating equipment. The most popular type of air preheating equipment heretofore proposed and used has been the so-called recuperators built out of refractory shapes which may be either continuous or regenerative in operation. Since the heat transfer characteristics of recuperators are poor, the equipment tends to be quite large and at the same time incapable of substantial amounts of heat recovery from combustion gases.

The present invention contemplates novel heat exchange apparatus which has high heat transfer characteristics and may be employed with furnaces exhausting high temperature combustion gases to recover substantial amounts of heat from the gases. In accordance with the present invention, a two section heat exchange apparatus, as for example, an air preheater, is provided, one of the sections being utilized to absorb heat primarily by radiation from the hot combustion gases as the latter enters the apparatus, and the other section having a tube bundle arranged to absorb heat primarily by convection.

The invention will be understood from a consideration of the detailed description which follows taken together with the accompanying drawing wherein one embodiment of the invention is illustrated.

Fig. 1 is a schematic representation of heat exchange apparatus embodying the present invention; and Fig. 2 is a side view of the radiant shield section of Fig. 1 looking from the left in Fig. 1.

Referring now to the drawing for a more detailed description of the present invention and more particularly to Fig. 1 wherein an embodiment thereof is clearly illustrated, heat exchange apparatus, as for example, an air preheater, generally designated by the numeral 11, comprises a gas intake conduit 13 which communicates at one end with a source of high temperature heating fluid, as for example, a furnace (not shown) to receive high temperature combustion gases therefrom. Intake conduit 13 is lined with a refractory lining 14 on the inside to protect the conduit from the destructive effects of the high temperature gases. A radiant shield section 15, substantially rectangular in cross-section, has a chamber 16 which communicates with the other end of conduit 13 and receives the combustion gases flowing through the conduit. Chamber 16 comprises oppositely disposed, top and bottom walls 17 and 18, respectively, a side wall 19 and a rear wall 20 arranged opposite a front wall (not shown). As may be seen from the drawing, chamber 16 is open at the side opposite wall 19 to accommodate one end of conduit 13 and all the walls of the chamber are insulated with a refractory lining.

A pair of substantially V-shaped inlet and outlet manifolds 23 and 24 (Fig. 2), respectively, encompass the opening of chamber 16 and are arranged outside of the chamber. V-shaped manifold 23 comprises leg portions 25 and 26 and outlet manifold 24 comprises leg portions 27 and 28 (Fig. 2), the leg portions 25 and 28 being disposed opposite and parallel to each other and leg portions 26 and 27 being similarly oppositely disposed. A pair of banks 30 and 32 of substantially U-shaped fluid conducting tubes 34 and 36, respectively are arranged in chamber 16 with the tubes of each bank disposed parallel to each other in their respective banks. The lower adjacent ends of tubes 34 are connected to leg portion 25 of inlet manifold 23 and the tubes extend parallel to bottom wall 18, then bend 90° to extend parallel to side wall 19, and again are bent 90° to extend parallel to top wall 17; the upper adjacent ends of tubes 34 are connected to leg portion 28 of outlet manifold 24. Adjacent ends of tubes 36 are connected to leg portion 26 of manifold 23 and the tubes extend parallel to and adjacent the rear wall 20, then bend 90° to extend parallel to and in space relationship with the portions of tubes 34 adjacent side wall 19, and again are bent 90° to extend parallel to the front wall (not shown) where the opposite adjacent ends of tubes 36 are connected to leg portion 27 of outlet manifold 24. From the foregoing, it may be seen that each wall of chamber 16 has disposed adjacent thereto at least a single row of tubes, the side wall 19 having an additional row of tubes with the tubes of one row extending transversely of the tubes of the other row.

Manifold 23 has an intake conduit 37 connected thereto at the junction of leg portions 25 and 26 (Fig. 2) and is connected to a conduit 38 which communicates with the discharge side of a pump or low pressure centrifugal compressor 39 (Fig. 1). A motor 40 drives compressor 39 which has its inlet or suction side connected to a source of fluid to be heated, as for example, the atmosphere. Compressor 39 compresses the air to a pressure above atmospheric and the air flows through conduit 38 and into inlet manifold 23. From the manifold 23 the air passes through tubes 34 and 36 at a relatively high velocity and into outlet manifold 24. A discharge conduit 42 is connected to manifold 24 at the junction of leg portions 27 and 28 and conducts the air to a nozzle 43 of a jet pump 44, to be described hereinafter. The air flowing through tubes 34 and 36 absorbs heat from the combustion gases primarily by radiation, and in flowing at a high velocity through the tubes prevents excessive overheating of the latter.

An opening 45 is provided in side wall 19 and accommodates a tube sheet 46 having openings for mounting the adjacent ends of a plurality of tubes of a tube bundle 47. Tube bundle 47 is disposed in a chamber 48 of a convection section 50, and the opposite adjacent ends of the tubes of bundle 47 are mounted in a tube plate 51 resiliently supported on a wall 52 by a flexible seal 53. A plenum chamber 54 is provided in convection section 50 and is in fluid tight relationship with chamber 48 but in communication with the tubes of tube bundle 47. A discharge stack 55, having a gas flow control damper 55A therein, is connected to section 50 and communicates with plenum chamber 54. The combustion gases in chamber 16 pass through the tubes of tube bundle 47, thence into plenum chamber 54, whence they are discharged to the atmosphere through stack 55.

The air passing through the tubes of tube banks 30 and 32 is utilized in the present arrangement as combustion air, or the fluid to be heated, and has a pressure value above that of atmospheric when it flows from nozzle 43 of jet pump 44; it being understood that the pressure of the air at the discharge side of compressor 39 is sufficient to compensate for the pressure drops through the intermediate conduits and still provide air from nozzle 43 at a pressure higher than atmospheric. Nozzle 43 extends into an inlet portion 56 of pump 44 and the outlet of the nozzle is arranged adjacent a restricted or throat portion 57. Inlet portion 56 has a tube 59 communicating therewith which is open to the atmosphere and a damper 60 is provided in tube 59 to control the flow of air through the tube and into inlet portion 56. The operation of jet pump 44 is well known to those skilled in the art and operates on the principle of an ejector, in which a small jet of fluid in rapid motion moves, by its impulse, a larger quantity of the fluid with which it mingles. Thus, in the present arrangement, the high pressure air issuing from nozzle 43 inspirates a large quantity of atmospheric air which flows through throat portion 57 and a flared outlet portion 61. Outlet portion 61 communicates with chamber 48 through an opening 62 formed in the wall of convection section 50 and the air from portion 61 flows into chamber 48. The atmospheric air entering inlet portion 56 of pump 44 has a temperature corresponding to ambient atmospheric temperature and after mingling with the heated air from nozzle 43 attains a temperature intermediate that of the atmospheric air and the heated air from the nozzle.

A baffle 63 extends from the upper wall of chamber 48, adjacent opening 62, to immediately below tube bundle 47 where it is spaced from the lower wall of chamber 48. A second baffle 64, spaced from baffle 63, extends from the lower wall of chamber 48 to immediately above the tube bundle where it is spaced from the upper wall of the chamber. The portions of baffles 63 and 64, intersecting the tube bundle, have openings to accommodate tubes therein and are constructed such that passage of fluid from one side of a baffle to the other side thereof is prevented except below the baffle 63 and above baffle 64. The heated air from pump 44 passes into chamber 48 through opening 62 and flows transversely and around the outside of the tubes of tube bundle 47 and countercurrent with the combustion gases flowing in the tubes. The air passing over the tubes of the tube bundle absorbs heat from the combustion gases in the tubes and the temperature of the air is raised to a value intermediate its entrance temperature in chamber 48 and the temperature of the combustion gas. An opening 65 is provided in the lower wall of chamber 48 between wall 19 and baffle 64 and communicates with a combustion air supply conduit 66 which is connected to one or more burners (not shown), to supply the latter with preheated combustion air.

In operation, combustion gases from the furnace (not shown) flow through gas intake conduit 13 into chamber 16 of radiant shield section 15. The tubes 34 and 36 are arranged to cool the high temperature combustion gases by radiation from the contained volume of combustion gases and the latter pass through the transversely arranged tube portions or double row of tubes, adjacent wall 19, at a lower temperature than the temperature of the gases entering the chamber. The arrangement of tubes 34 and 36 adjacent wall 19 offers a double row tubular shield for tube sheet 46. Despite the fact that the temperature of the combustion gas entering the tubes of convection tube bundle 47 is still quite high, the shield effect on the hot end tube sheet 46 is that of intercepting radiation from the gas mass from directions where the radiant beam length is longer. It may be readily understood that the mean radiant beam length of the gas mass between the double row of tubes and tube sheet 46 is much smaller, therefore, the intensity, or radiant heat is correspondingly decreased so that overheating and failure of the tube sheet is prevented. The combustion gases pass through tube sheet 46 and flow in the tubes of tube bundle 47 whence they flow into plenum chamber 58 and out of apparatus 11 through stack 55.

The combustion air for the fuel burners is drawn into the heat exchange apparatus 11 by compressor 39 and the pressure of the air is raised by the compressor to a value above atmospheric. The combustion air then passes through tubes 34 and 36 at a high velocity to absorb heat from the combustion gases in radiant shield section 15. Combustion air then flows through nozzle 43 to inspirate a quantity of atmospheric air through inlet portion 56. The mixture then flows to chamber 48 of convection section 50 where it flows over the tubes of tube bundle 47 and in convection heat exchange relationship with the combustion gases flowing through the tubes. Preheated combustion air then flows through the opening 65, in lower wall of the chamber 48, to the fuel burners (not shown). Damper 60 in tube 59 is automatically positioned by an oxygen recorder controller (not shown) which samples the gases in the stack to control the air fuel ratio to the burners.

In order to avoid excessive amounts of combustion air over that required by the fuel, the quantity of air compressed, by compressor 39, is reduced to a value such that the balance of the required combustion air will be made up in the air jet pump 44. For example, the compressor may supply one-fifth of the required combustion air, while the remaining air is drawn in through inlet portion 56. In this way, the power cost for operation of compressor 39 is not excessively higher than those which would exist for the normal force draft fan in the usual air preheating equipment. It will be seen that the present invention does not require both a high pressure compressor and a low pressure fan because of the air jet pump. In this manner, a single compressor is made to furnish the various pressure levels required in the different sections of the air preheater 11. It will also be seen that condensation of moisture on the tubes of tube bundle 47 is prevented by passing heated combustion air over the tubes rather than cold or atmospheric temperature combustion air. Condensation of moisture on the tubes in the radiation shield section 15 is also prevented because the tube metal temperatures will be several hundred degrees higher than that of the combustion air.

Although one embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. Heat exchange apparatus of the class described, comprising a first section having a chamber connected to receive a heating fluid, a source of fluid to be heated, conduit means having an inlet and an outlet and arranged in said chamber in communication with said source to provide a path of flow for fluid to be heated in heat exchange relationship with the heating fluid, means communicating with the inlet of said conduit means for raising the pressure of the fluid to be heated above atmospheric pressure and transmitting said fluid to be heated through said conduit means, the pressure of said fluid to be heated at said inlet being sufficient to cause the last-mentioned fluid at the outlet of said conduit means to be above atmospheric pressure, means for mixing the fluid to be heated from the outlet of said conduit means with fluid to be heated at atmospheric pressure to effect a resultant fluid to be heated at a pressure and temperature intermediate the pressures and temperatures respectively of the fluid to be heated at said outlet of said conduit means and the fluid to be heated at atmospheric pressure, a second section having a second chamber, means for passing the heating fluid from the first chamber into said second chamber, and means for conducting the resultant fluid to be heated into said second chamber and in heat exchange relationship with the heating fluid in said second chamber.

2. The heat exchange apparatus of claim 1 wherein the mixing comprises a jet pump having an inlet connected to receive fluid to be heated at atmospheric pressure, and a nozzle connected to the outlet of said conduit means and arranged in said jet pump to cause said fluid to be heated from said conduit means to issue from the nozzle to inspirate the fluid to be heated at atmospheric pressure through said jet pump inlet.

3. Heat exchange apparatus of the class described, comprising a first section having a chamber connected to receive high temperature combustion gases, conduit means arranged in said chamber and having an inlet and an outlet, a compressor adapted to compress combustion air from atmospheric pressure to above atmospheric pressure and connected to the inlet of said conduit means to transmit the combustion air to the latter, said combustion air in said conduit means being in heat exchange relationship with the combustion gases, a second section having a second chamber for receiving the combustion gases from the first chamber, an air jet pump having a portion connected to receive combustion air at atmospheric pressure and a nozzle connected to the outlet of said conduit means to provide passage of said air from the latter through said air jet pump, the passage of the air from said conduit means into said air jet pump causing the air at atmospheric pressure to be drawn into the jet pump in admixture with the higher pressure combustion air to effect a resultant mixture having a pressure intermediate atmospheric pressure and the pressure of fluid to be heated at the outlet of said conduit means, and means communicating with the air jet pump and with said second chamber for passing said mixture into the latter and in convection heat exchange relationship with the combustion gases in said second chamber.

4. Heat exchange apparatus of the class described, comprising a first section having a chamber connected to receive a heating fluid, a second section having a second chamber, means forming a flow path in said first-mentioned chamber having an inlet and an outlet for conducting a fluid to be heated in heat exchange relationship with the heating fluid, a source of fluid to be heated in communication with said flow path for supplying fluid to the latter, pressure raising means communicating with the inlet of said flow path and with said source for increasing the pressure of the fluid to be heated from said source to a predetermined value above the pressure of the fluid available at said source, means in communication with a second source of said fluid to be heated and with the outlet of said flow path and said second chamber, the last-mentioned means being operable by the residual pressure of the fluid to be heated from the outlet of said flow path to induce additional fluid to be heated from said second source for flow into said second chamber and for mixing of both fluids to be heated to effect a resultant fluid to be heated having a pressure intermediate the residual pressure value of the fluid to be heated from the outlet of said flow path and the pressure at both said sources, and means forming a second flow path in said second chamber and in communication with said first chamber to receive the heating fluid therefrom for heat exchange relationship with the resultant fluid to be heated.

5. Heat exchange apparatus of the class described, comprising a first section having a chamber connected to receive a heating fluid, a source of fluid to be heated in communication with said chamber, conduit means having an inlet and an outlet and arranged in said chamber in communication with said source to provide a path of flow for fluid to be heated in heat exchange relationship with the heating fluid, means communicating with the inlet of said conduit means for raising the pressure of the fluid to be heated above atmospheric pressure and transmitting said fluid to be heated through said conduit means, the pressure of said fluid to be heated at said inlet being sufficient to cause the last-mentioned fluid at the outlet of said conduit means to be above atmospheric pressure, mixing means in communication with a second source of fluid to be heated at atmospheric pressure and in communication with the outlet of said conduit means for intimately mixing both fluids to be heated and providing a resultant fluid to be heated at a pressure intermediate atmospheric pressure and the pressure of the fluid to be heated at the outlet of said conduit means, a second section having a second chamber, means for passing the heating fluid from the first chamber into said second chamber, and means in communication with said mixing means and said second chamber for conducting the resultant fluid to be heated into said second chamber in heat exchange relationship with the heating fluid in the last-mentioned chamber.

References Cited in the file of this patent

UNITED STATES PATENTS

| | | |
|---|---|---|
| 1,785,334 | Black | Dec. 16, 1930 |
| 1,814,011 | Snow | July 14, 1931 |
| 1,853,684 | Jacobus | Apr. 12, 1932 |
| 2,072,166 | Goodman | Mar. 2, 1937 |
| 2,287,268 | Palmer | June 23, 1942 |

FOREIGN PATENTS

| | | |
|---|---|---|
| 282,717 | Great Britain | May 3, 1928 |

UNITED STATES PATENT OFFICE
CERTIFICATE OF CORRECTION

Patent No. 2,951,685                          September 6, 1960

Charles Bliss et al.

It is hereby certified that error appears in the printed specification of the above numbered patent requiring correction and that the said Letters Patent should read as corrected below.

Column 5, line 22, after "mixing" insert -- means --.

Signed and sealed this 11th day of April 1961.

(SEAL)
Attest:
ERNEST W. SWIDER
Attesting Officer

ARTHUR W. CROCKER
Acting Commissioner of Patents